US009919545B2

(12) United States Patent
Sakamoto

(10) Patent No.: US 9,919,545 B2
(45) Date of Patent: Mar. 20, 2018

(54) RECORDING APPARATUS

(71) Applicant: SEIKO EPSON CORPORATION, Tokyo (JP)

(72) Inventor: Naoki Sakamoto, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/737,118

(22) Filed: Jun. 11, 2015

(65) Prior Publication Data

US 2015/0363675 A1 Dec. 17, 2015

(30) Foreign Application Priority Data

Jun. 12, 2014 (JP) ................................ 2014-121370

(51) Int. Cl.
*G06F 15/00* (2006.01)
*B41J 29/02* (2006.01)

(52) U.S. Cl.
CPC ............ *B41J 29/023* (2013.01); *B41J 29/02* (2013.01)

(58) Field of Classification Search
CPC ............................ G06K 15/002; G06K 15/02
USPC .......................................................... 358/1.8
See application file for complete search history.

(56) References Cited

U.S. PATENT DOCUMENTS

2003/0035039 A1* 2/2003 Kanome .............. B41J 11/0065 347/104
2005/0248647 A1* 11/2005 Tanaami .................. B41J 29/02 347/108
2007/0024924 A1 2/2007 Ikeno et al.
2013/0301066 A1* 11/2013 Ojiro ...................... B41J 2/2114 358/1.9
2014/0009777 A1* 1/2014 Shimazu ............ H04N 1/00525 358/1.13

FOREIGN PATENT DOCUMENTS

JP 2007-036620 A 2/2007
JP 2007-210213 A 8/2007

* cited by examiner

*Primary Examiner* — Mark R Milia
(74) *Attorney, Agent, or Firm* — Workman Nydegger

(57) ABSTRACT

A printer is configured such that a low position face is formed in an upper portion of a frame that forms a skeleton of an apparatus body thereof, and a panel unit that provides a user with a function of operating the printer and a function of displaying various items is disposed in a state of being embedded in the low position face. This configuration enables the height-direction size (the z-axis direction size) of the printer to be suppressed to a size smaller than the size resulting from independently adding the height-direction size of the frame to the height-direction size of the panel unit.

21 Claims, 8 Drawing Sheets

RECORDING APPARATUS

BACKGROUND

1. Technical Field

The present invention relates to a recording apparatus typified by a printer, a facsimile machine, and the like.

2. Related Art

A printer as an example of a recording apparatus is sometimes configured to, as described in JP-A-2007-210213, include a display portion (a monitor display) and a set of operation buttons for use in operating the printer, and thereby be operable in a so-called standalone environment.

In such a printer, in many cases, a frame extending in a lateral width direction is provided as a main skeleton of an apparatus body of the printer and various constituent elements are mounted and attached to the frame. Particularly, in a so-called serial printer which performs printing by allowing a recording head to reciprocate in a paper width direction (an apparatus width direction), the frame is sometimes disposed in the vicinity of a central portion of the serial printer in an apparatus depth direction.

Thus, in the case where a set of operation buttons and a display portion such as described in JP-A-2007-210213 are disposed in the vicinity of a central portion of a printer in an apparatus depth direction, the height of the printer resulting from adding the height of the set of operation buttons or the height of the display portion to the height of the frame increases, which causes a problem. Further, in order to solve this problem, in the case where the position of the frame and the positions of the set of operation buttons and the display portion are shifted in the apparatus depth direction such that the set of operation buttons and the display portion do not overlap the frame in a plan view, as a result, the depth of the printer increases this time.

In view of a recent demand for further downsizing of printers, the above situation is not preferable. Particularly, with respect to mobile type printers which are intended to be carried by users, further downsizing has been strongly demanded.

SUMMARY

An advantage of some aspects of the invention is that a recording apparatus is provided, which is configured to be able to be further downsized in a configuration including a frame to which at least one constituent element is mounted and attached, and a panel unit that provides a user with at least one of a function of operating the recording apparatus and a function of displaying various items.

A recording apparatus according to a first aspect of the invention includes a frame to which at least one component is mounted and attached, and a panel unit that is located in an upper portion of the frame and that provides a user with at least one of a function of operating the recording apparatus and a function of displaying various items. Further, the frame includes a high position face and a low position face in an upper portion of the frame, and at least a portion of a lower portion of the panel unit is disposed in a state of being embedded in a side of the low position face.

According to this aspect, the high position face and the low position face are formed in an upper portion of the frame to which at least one component is mounted and attached, and at least a portion of a lower portion of the panel unit that provides a user with at least one of a function of operating the recording apparatus and a function of displaying various items is disposed in a state of being embedded in a side of the low position face. Thus, this configuration enables the height-direction size of the recording apparatus to be suppressed to a size smaller than the size resulting from independently adding the height-direction size of the frame to the height-direction size of the panel unit. Moreover, this configuration makes it unnecessary to shift the positions of the frame and the panel unit in a horizontal direction, and thus also contributes to suppression of the increase of the horizontal-direction size of the recording apparatus.

A recording apparatus according to a second aspect of the invention includes a frame to which at least one component is mounted and attached; a housing that contains the frame; and a panel unit that is located in an upper portion of the frame and that provides a user with at least one of a function of operating the recording apparatus and a function of displaying various items. Further, the frame includes a high position face and a low position face in an upper portion of the frame; a concave portion embedded in a side of the low position face is formed below a lower face of an upper portion of the housing; and the panel unit is disposed in the concave portion.

According to this aspect, a high position face and a low position face are formed in an upper portion of a frame to which at least one component is mounted and attached; a concave portion embedded in a side of the low position face of the frame is formed below a lower face of an upper portion of the housing; and the panel unit is disposed in the concave portion. Thus, this configuration enables the height-direction size of the recording apparatus to be suppressed to a size smaller than the size resulting from independently adding the height-direction size of the frame to the height-direction size of the panel unit. Moreover, this configuration makes it unnecessary to shift the positions of the frame and the panel unit in a horizontal direction, and thus this configuration also contributes to suppression of the increase of the horizontal-direction size of the recording apparatus.

According to a third aspect of the invention, in any one of the first and second aspects, the recording apparatus further includes a feeding roller that feeds a medium, and a rotation shaft of the feeding roller is provided so as to extend along the low position face of the frame in a state of not projecting from the low position face of the frame.

According to a fourth aspect of the invention, in the third aspect, the feeding roller is provided in a state of not projecting from a connection face that interconnects the high position face of the frame and the low position face of the frame, and the feeding roller is located at a position facing an area that is contained in the frame and that is formed by the connection face.

According to a fifth aspect of the invention, in any one of the third and fourth aspects, the feeding roller and the panel unit are disposed in a state of being arranged along an extension direction of the frame.

According to a sixth aspect of the invention, in any one of the first to fifth aspects, the recording apparatus further includes a carriage that includes a recording head for performing recording onto a medium and that reciprocates along the extension direction of the frame; and a linear scale that is provided so as to extend along the extension direction of the frame and that constitutes a detection means for detecting a position of the carriage, and the linear scale is disposed between the high position face of the frame and the low position face of the frame in a vertical direction.

According to a seventh aspect of the invention, in the sixth aspect, a top portion of the carriage is located at a position whose height is substantially the same as a height of the high position face of the frame.

According to an eighth aspect of the invention, in any one of the first to seventh aspects, the panel unit is supported by the frame in at least one case where a pressing force having a magnitude larger than a predetermined magnitude is applied to the panel unit.

According to this aspect, the panel unit is supported by the frame in at least one case where a pressing force having a magnitude larger than a predetermined magnitude is applied to the panel unit. Thus, this configuration enables suppression of sinking-down of the panel unit having been subjected to a push-down operation, and thus brings about a favorable operation feeling.

According to a ninth aspect of the invention, in the eighth aspect, a projecting portion that projects along a direction intersecting with a height direction is formed on the low position face of the frame, and the projecting portion supports the panel unit.

According to this aspect, a projecting portion is formed on the low position face of the frame, and the projecting portion supports the panel unit. Thus, this projecting portion makes it possible to support the panel unit in a wider area, that is, support the panel unit with more certainty.

According to a tenth aspect of the invention, in any one of the sixth and seventh aspects, a driving motor for driving the carriage is attached to a portion of an area constituting the frame and being located outside an area which constitutes the frame and in which the low position face is formed.

According to an eleventh aspect of the invention, in any one of the sixth and seventh aspects, a guide frame for supporting the carriage and guiding the carriage in a predetermined direction is attached to the frame, and the guide frame is made of a material having a larger specific gravity than a specific gravity of a material of the frame.

According to this aspect, a guide frame for supporting the carriage and guiding the carriage in a predetermined direction is attached to the frame, and the guide frame is made of a material having a higher hardness degree than a hardness degree of a material of the frame. Thus, the use of such a frame enables realization of a weight reduction, and the use of such a guide frame enables realization of a high abrasion resistance. That is, this configuration enables realization of both a weight reduction and an endurance enhancement with respect to the recording apparatus.

According to a twelfth aspect of the invention, in any one of the first to eleventh aspects, the recording apparatus further includes an inclination detection means for detecting an inclination of the recording apparatus, and a cable that interconnects the inclination detection means and the panel unit is wired along the high position face of the frame.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described on the basis of the drawings. This embodiment will be described on the premise that the invention is not limited to this embodiment, but can be variously modified within the scope of the invention set forth in appended claims, and such modifications are also included in the scope of the invention.

Figure 1:
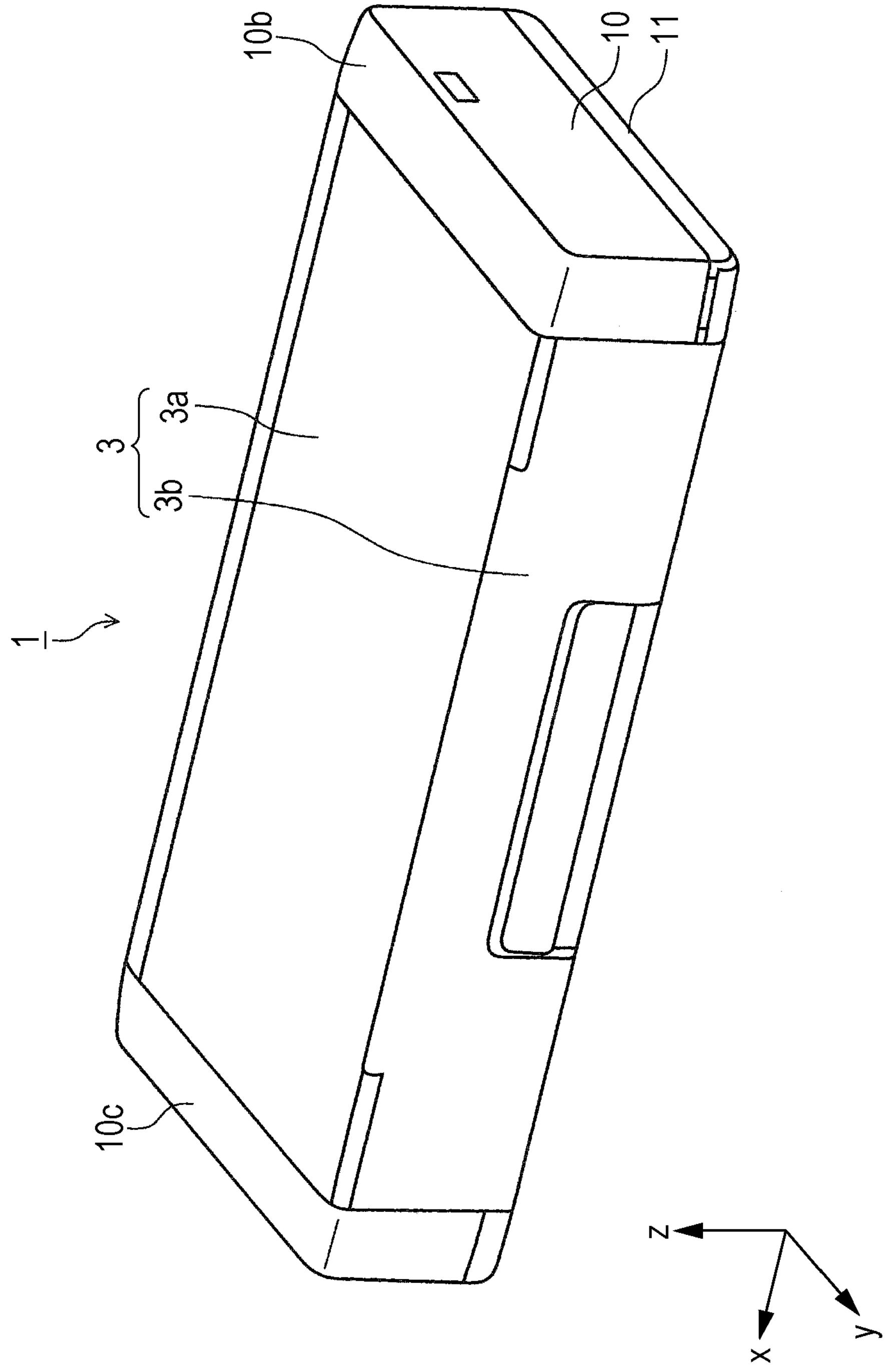
FIG. 1 illustrates an external perspective view of a printer according to an embodiment of the invention (when an opening/closing cover thereof is in a closed state).
Figure 2:
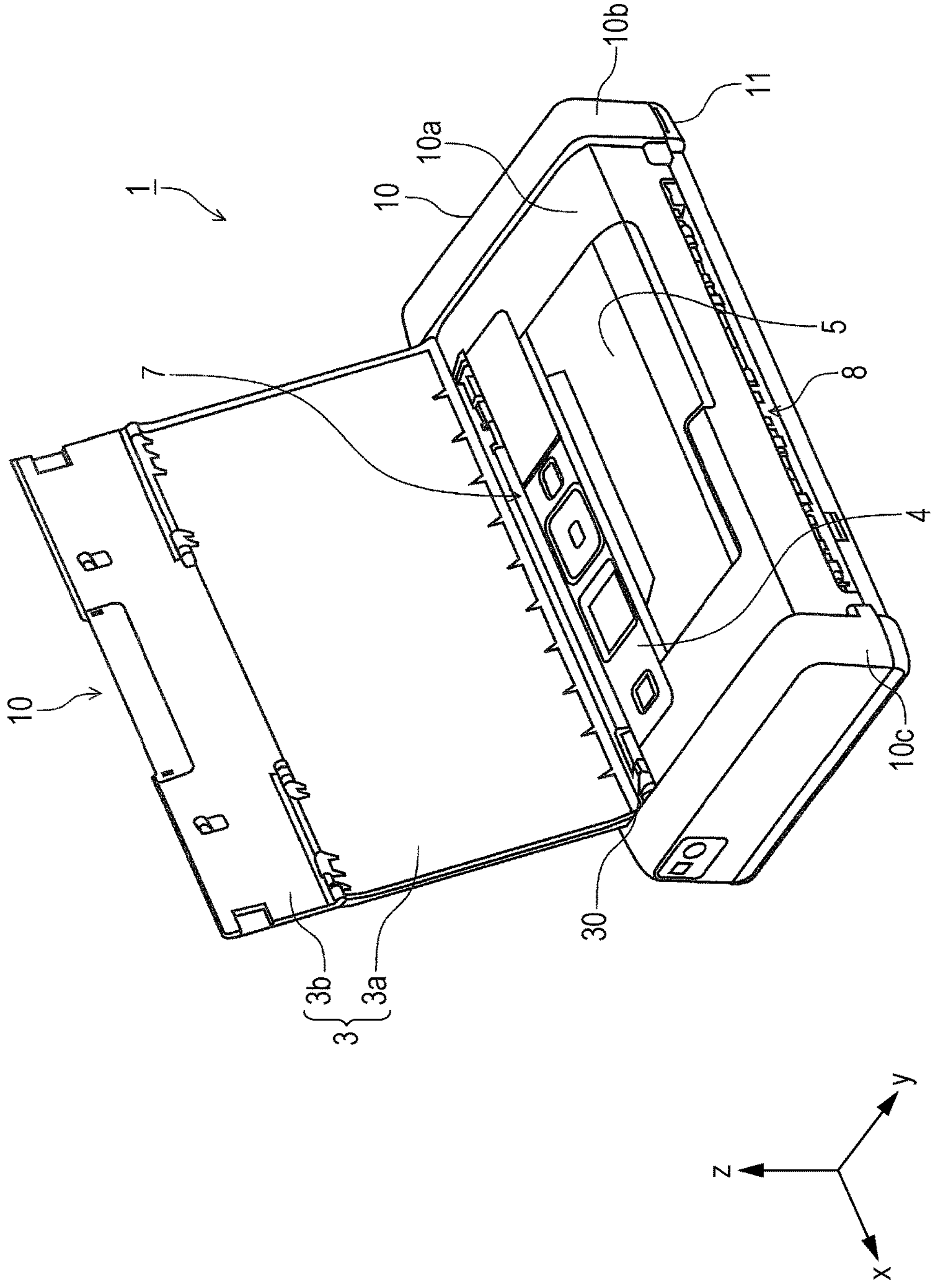
FIG. 2 illustrates an external perspective view of a printer according to an embodiment of the invention (when an opening/closing cover thereof is in an open state).

FIGS. 1 and 2 are external perspective views of an ink jet printer 1 (hereinafter, referred to as "a printer 1") which is an embodiment of the "recording apparatus" according to the invention; FIG. 1 illustrates an external perspective views of the printer 1 when an opening/closing cover 3 is in a closed state; and FIG. 2 illustrates an external perspective view of the printer 1 when the opening/closing cover 3 is in an open state.

Figure 3:
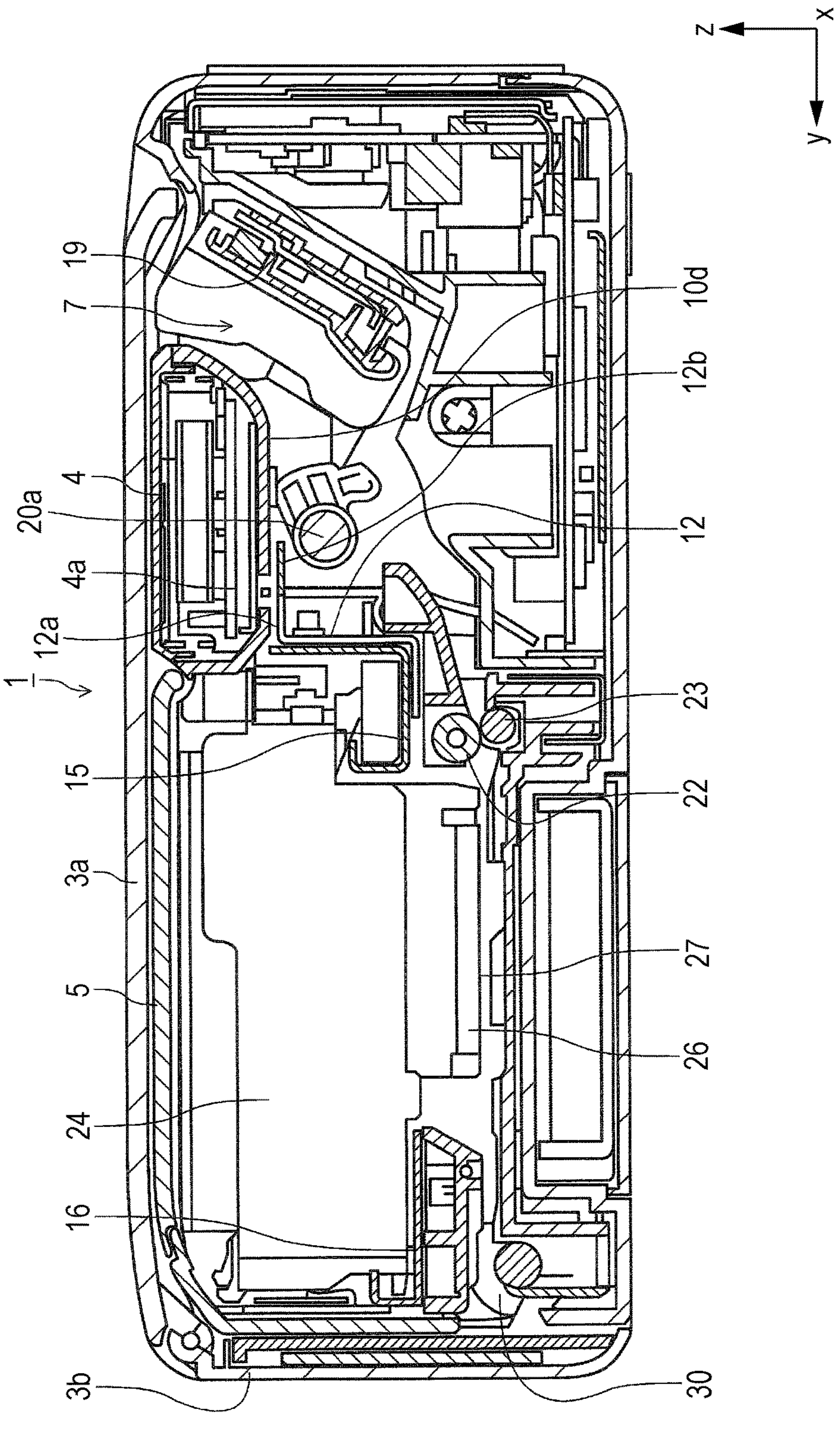
FIG. 3 is a cross-sectional view illustrating a printer according to an embodiment of the invention, and being taken along a plane defined by a y-axis and a z-axis.
Figure 4:
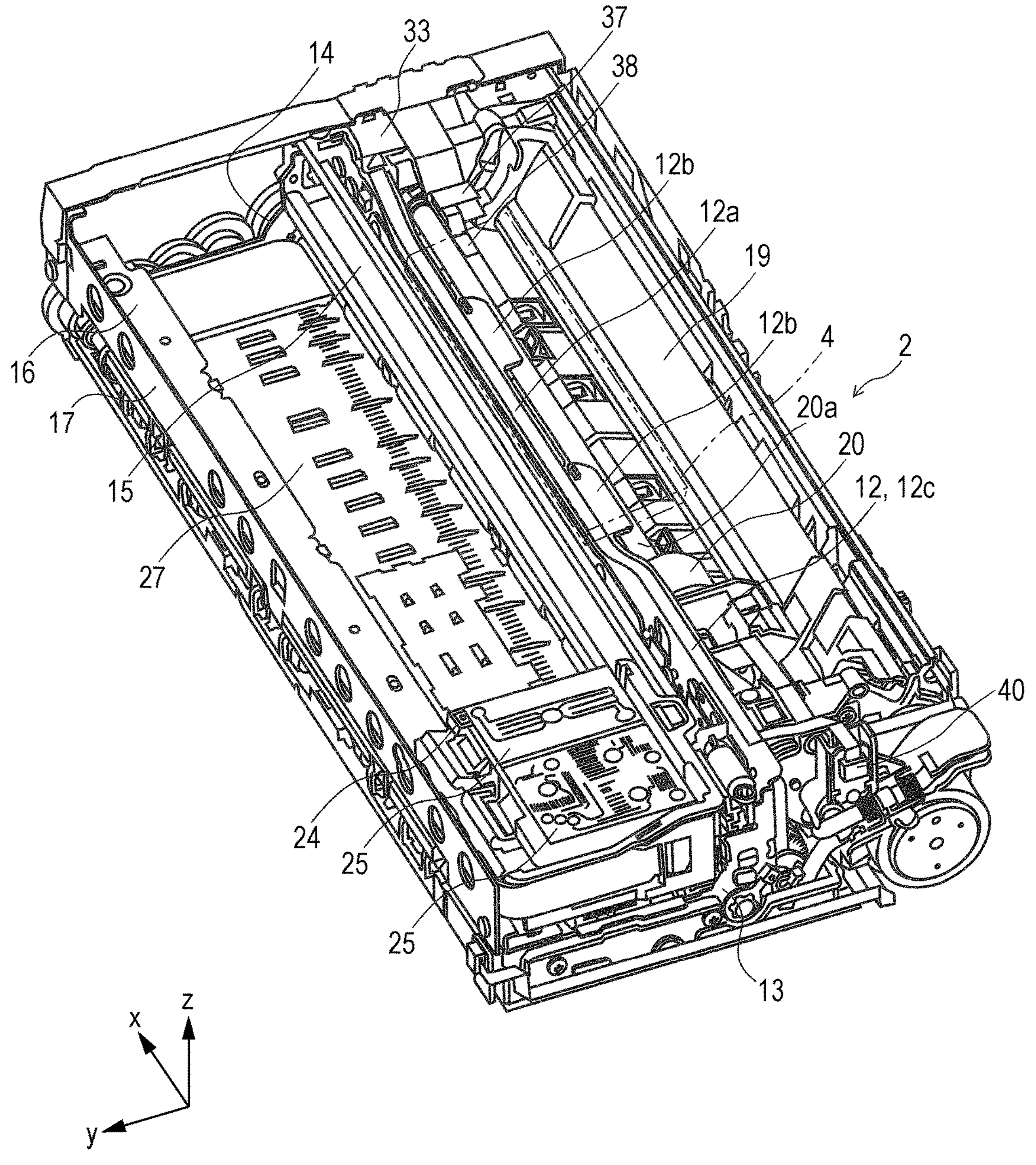
FIG. 4 is a perspective view of an apparatus body of a printer according to an embodiment of the invention.
Figure 5:
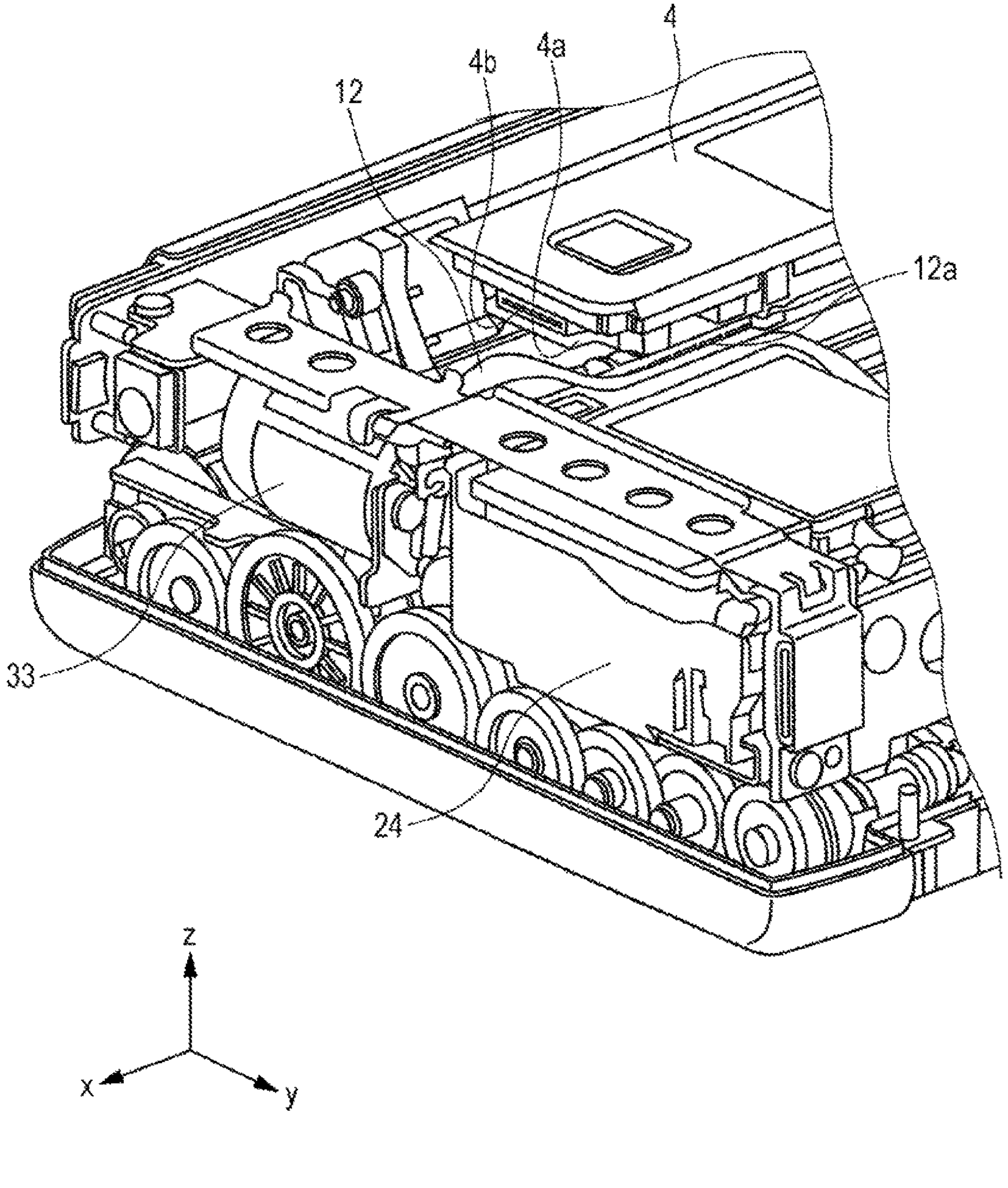
FIG. 5 is a partially enlarged perspective view of an apparatus body of a printer according to an embodiment of the invention.
Figure 6:
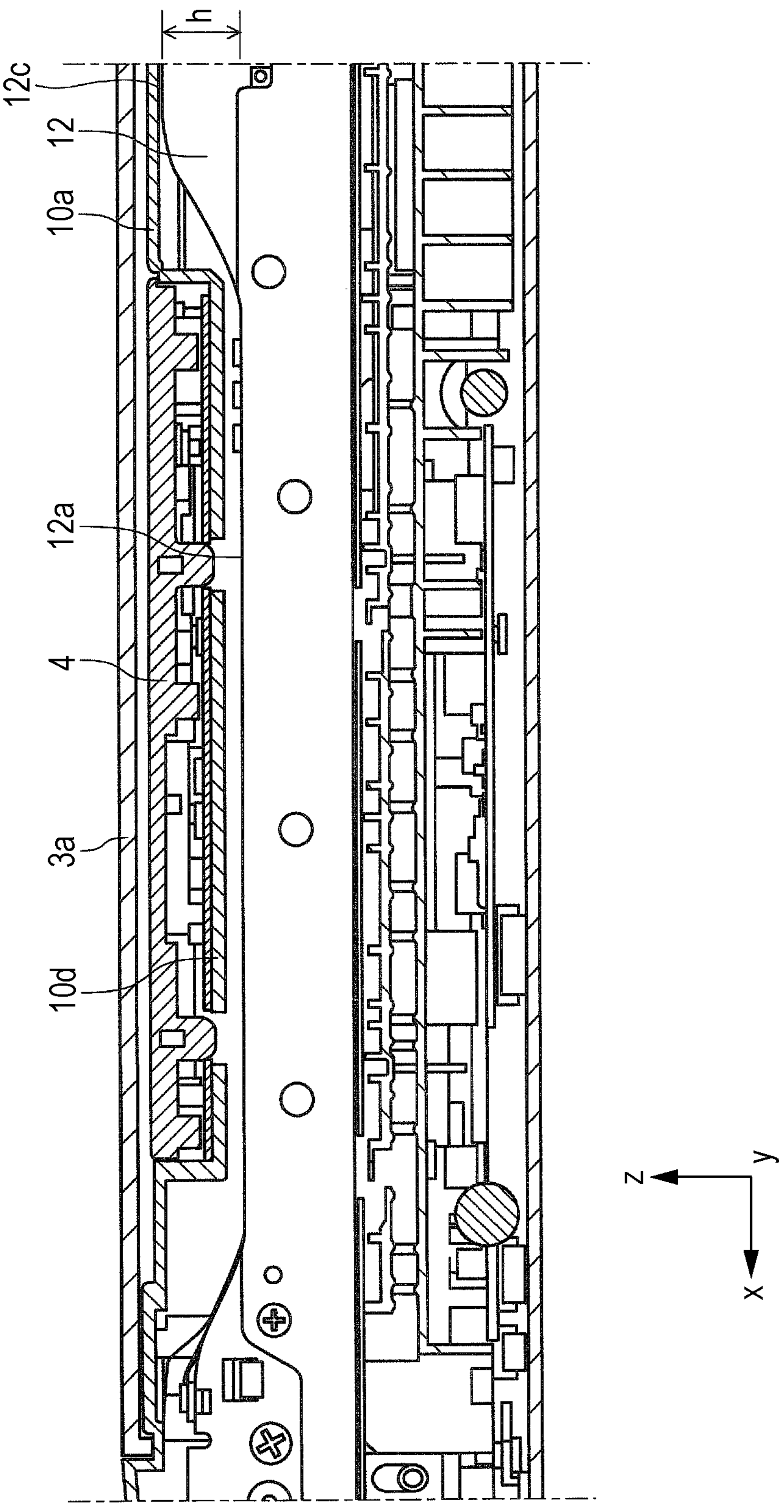
FIG. 6 is a cross-sectional view illustrating a printer according to an embodiment of the invention, and being taken along a plane defined by an x-axis and a z-axis.

Further, FIG. 3 is a cross-sectional view of the printer 1 taken along a plane defined by the y-axis and the Z-axis; FIG. 4 is a perspective view of an apparatus body 2 of the printer 1 (in a state in which a housing is removed); FIG. 5 is a partially enlarged perspective view of the apparatus body 2; and FIG. 6 is a cross-sectional view of the printer 1 taken along a plane defined by the x-axis and the z-axis.

Figure 7:
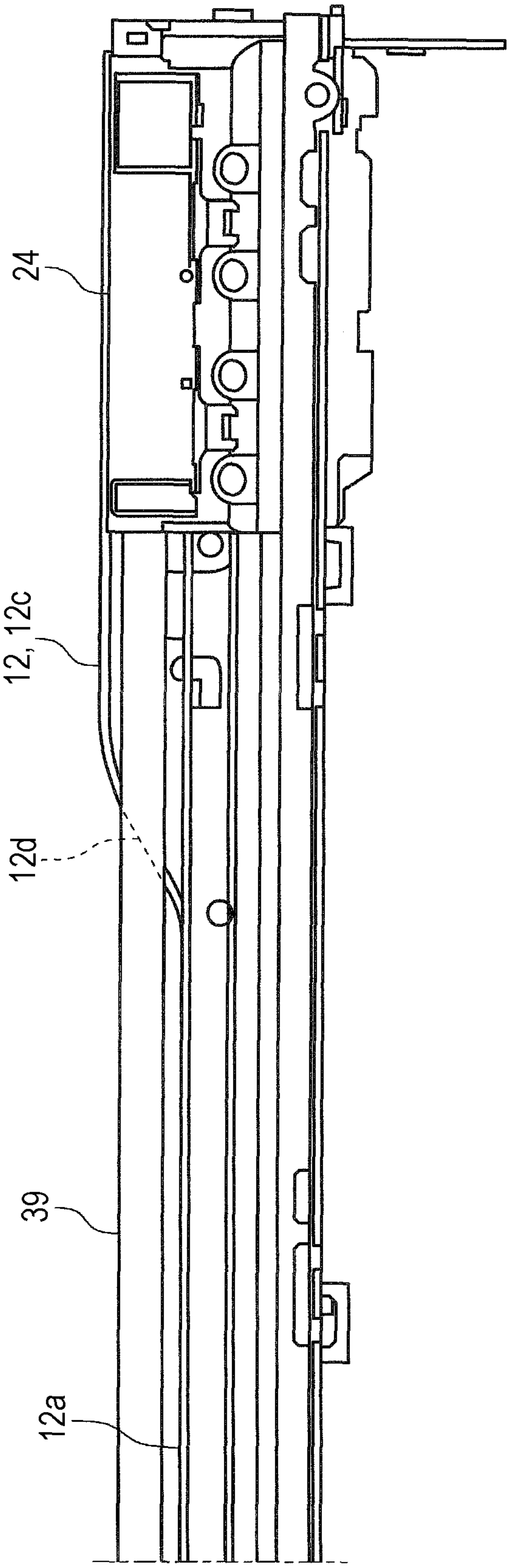
FIG. 7 is a front view of a carriage and a frame that are included in a printer according to an embodiment of the invention.
Figure 8:
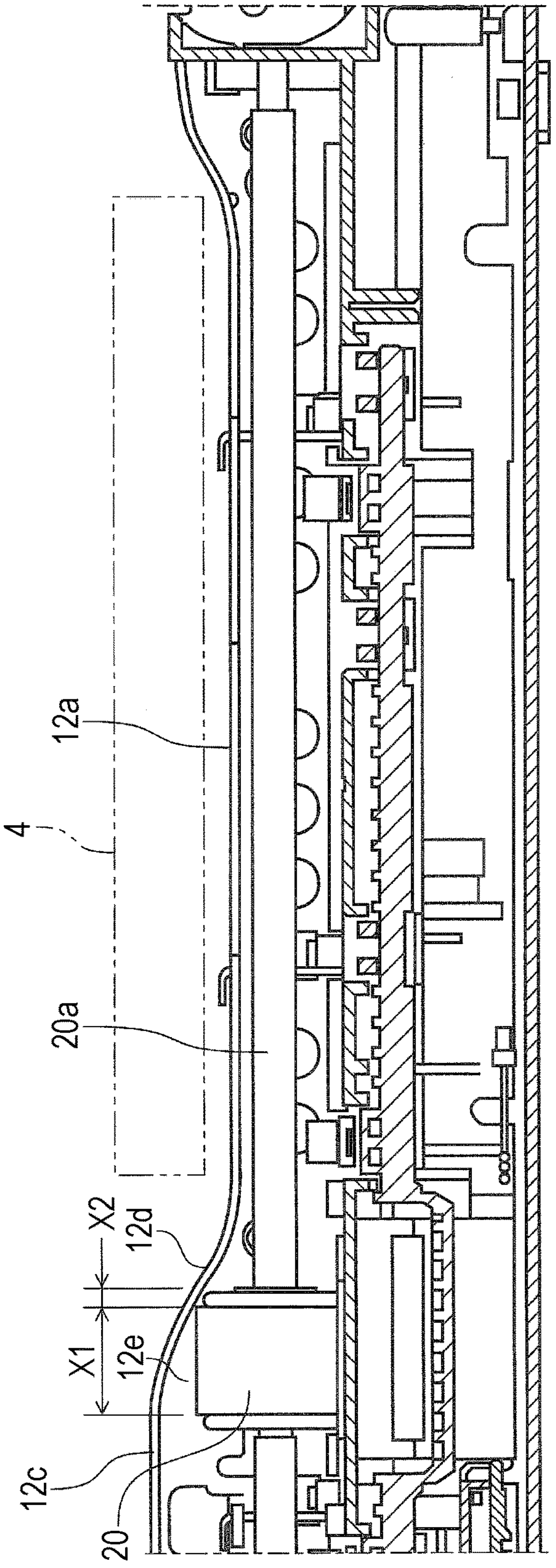
FIG. 8 is a front view of a feeding roller, a feeding roller shaft, and a frame that are included in a printer according to an embodiment of the invention.

Moreover, FIG. 7 is a front view of a carriage 24 and a main frame 12; and FIG. 8 is a front view of a feeding roller 20, a feeding roller shaft **20*a*, and the main frame 12 (the front view being a front view when viewed from a rear face side of the printer 1**).

In addition, in an x-y-z axis orthogonal coordinate system shown in each of FIGS. 1 to 6, the x-axis direction is a horizontal direction corresponding to a direction orthogonal to a paper transportation direction, that is, a paper width direction; an apparatus left-right direction; and a movement direction (a main-scanning direction) of the carriage 24. Further, the y-axis direction is a horizontal direction corresponding to the paper transportation direction and an apparatus depth direction. Moreover, the z-axis direction is a gravitational force direction corresponding to an apparatus height direction.

Hereinafter, the entire configuration of the printer 1 will be outlined while referring to mainly FIGS. 1 to 4. The printer 1 is a so-called serial ink jet printer which performs recording by repeatedly and alternately performing a recording operation and a paper transportation operation. Further, in order to realize the portability of the printer 1, the printer 1 is configured to be able to be downsized.

As shown in FIGS. 1 and 2, a housing forming the appearance of the printer 1 is constituted by an upper housing 10 forming an upper side of the appearance of the printer 1 and a lower housing 11 forming a lower side of the appearance of the printer 1, and each of the upper and lower housings is made of a resin material in this embodiment.

An opening/closing cover 3 that brings part of the upper portion of the upper housing 10 into an uncovered/covered state is provided on the part of the upper portion of the upper housing 10. The opening/closing cover 3 is provided so as to be pivotable around a pivot shaft (not illustrated), and an operation of pivoting the opening/closing cover 3 brings a central upper portion and a central front portion of the upper housing 10 into an uncovered/covered state. In addition, with respect to the upper housing 10, a reference sign 10*a* denotes the central upper portion, and each of reference signs 10*b* and 10*c* denotes a corresponding one of two side portions.

Further, a panel unit 4 functioning as a panel portion and including a power on/off button, various printing setting buttons, and a display portion for displaying various items is provided so as to be flush with the upper face of the central upper portion 10*a* of the upper housing 10. The opening/closing cover 3 brings the panel unit 4 into an uncovered/covered state, and an operation of opening the opening/closing cover 3 allows the panel unit 4 to appear to the outside.

Further, a sub-cover 5 that allows the inside of the printer 1 to be exposed to the outside is provided on the central upper portion 10*a* of the upper housing 10. An operation of opening the sub-cover 5 allows a paper transportation path provided inside the printer 1 to be exposed to the outside, thereby making it possible to perform, for example, an operation of attaching/detaching any one or ones of ink cartridges 25 to/from a carriage 24. In addition, the cartridges 25 and the carriage 24 are shown in FIG. 4, and will be described below.

Next, a paper ejection outlet 8, through which a sheet of paper having been subjected to recording is sequentially ejected, is provided on the central front portion of the upper housing 10 and is brought into an uncovered/covered state by the opening/closing cover 3. The sheet of paper is just an example of a recording medium and is omitted from illustration. Here, the opening/closing cover 3 is constituted by an upper portion cover 3*a* that brings the upper face of the printer 1 into an uncovered/covered state and a paper ejection outlet cover 3*b* that brings the front face of the printer 1 into an uncovered/covered state. Further, the upper portion cover 3*a* and the paper ejection outlet cover 3*b* are relatively pivotably joined to each other so as to be integrally openable/closable. The upper portion cover 3*a* brings the central upper portion 10*a* of the upper housing 10 into an uncovered/covered state, and the paper ejection outlet cover 3*b* brings the paper ejection outlet 8 into an uncovered/covered state.

The printer 1 is configured such that, when the opening/closing cover 3 is in a closed state, the upper face of the upper portion cover 3*a* constituting the opening/closing cover 3 is flush with the upper faces of the side portions 10*b* and 10*c* of the upper housing 10, and the outside face of the paper ejection outlet cover 3*b* constituting the opening/closing cover 3 is flush with the front faces of the side portions 10*b* and 10*c* of the upper housing 10. That is, the printer 1 is configured such that, when the opening/closing cover 3 is in a closed state, any large step difference is not formed between the opening/closing cover 3 and the upper housing 10.

Further, the printer 1 is configured such that, when the upper cover 3*a* is in an open state, a paper feeding inlet 7 appears in an upper portion of the printer 1 so as to enable a user to feed sheets of paper therefrom. Further, when the opening/closing cover 3 is in an open state, the opening/closing cover 3 also functions as a supporting means that supports sheets of paper having been set into the paper feeding inlet 7 and being in a feeding waiting state (or in a feeding execution state) such that the sheets of paper are kept in an inclined attitude.

The above is description of a portion constituting the configuration of the printer 1 and being understandable from the appearance thereof, and hereinafter, an internal configuration of the printer 1 (i.e., a paper transportation path) will be outlined while referring to FIG. 3. The printer 1 is a so-called serial ink jet printer which performs recording by repeatedly and alternately performing a recording operation and a paper transportation operation. A reference sign 19 denotes a hopper, and a plurality of sheets of paper having been set into the paper feeding inlet 7 are supported by the hopper 19 and the above-described opening/closing cover 3 being in an open state such that the plurality of sheets of paper are kept in an inclined attitude.

The hopper 19 allows the supported sheets of paper to move forward and backward relative to the feeding roller 20 (not illustrated in FIG. 3, and refer to FIGS. 4 and 8) by swinging about a swing supporting point (not illustrated). A sheet of paper placed at the uppermost position among the sheets of paper having been set is brought into contact with the feeding roller 20 by a shift-up operation of of the hopper 19, and then, the sheet of paper is fed toward the downstream side by the rotation of the feeding roller 20. In addition, in FIGS. 3, 4, and 8, a reference sign 20*a* denotes a rotation shaft of the feeding roller 20.

A paper transportation means provided with a transportation driving roller 23 and a transportation driven roller 22 is provided at the downstream side of the feeding roller 20, and these rollers transport the sheet of paper to a position below an ink jet recording head 26.

The ink jet recording head 26 is provided in the carriage 24, which mounts the ink cartridges 25 (FIG. 4) thereon and reciprocates in the paper width direction (the x-axis direction) by being subjected to a driving force from a carriage driving motor 33 (FIGS. 4 and 5). In addition, in this embodiment, the printer 1 is a printer of a so-called on-carriage type in which the ink cartridges 25 are mounted on the carriage 24, but the printer 1 may be a printer of a so-called off-carriage type in which the ink cartridges 25 are provided independently from the carriage 24 and ink tubes interconnect the ink cartridges 25 and the recording head 26.

A paper supporting member 27 that supports a sheet of paper thereon is provided at a position facing the ink jet recording head 26, and an ejection roller 30 that ejects the sheet of paper having been subjected to recording is provided at the downstream side of the ink jet recording head 26 and the paper supporting member 27. The sheet of paper having been subjected to recording is ejected by the ejection roller 30 toward the apparatus front side through the paper ejection outlet 8.

The above is description of the entire configuration of the printer 1, and hereinafter, the panel unit 4 and frames that form a skeleton of the apparatus body 2 of the printer 1 will be described in detail while also referring to figures following FIG. 4.

In the apparatus body 2 contained in the upper housing 10 and the lower housing 11, the skeleton thereof is constituted by a plurality of frames. Specifically, as shown in FIG. 4, the skeleton is constituted by the main frame 12, side frames 13 and 14, a sub-frame 17, and guide frames 15 and 16.

Referring to FIG. 3, which illustrates a cross-sectional view of the printer 1, the main frame 12 extends in an upper/lower direction, the upper portion thereof being formed so as to bend in an "L" shape toward the apparatus rear side, the lower portion thereof being formed so as to bend in an "L" shape toward the apparatus front side. Further, the main frame 12 having such a cross-sectional view overall extends in the movement direction of the carriage 24 (i.e., in the x-axis direction). Various constituent members, for examples, the carriage driving motor 33 that drives the carriage 24, and the like, are mounted and attached to the main frame 12. In addition, the carriage driving motor 33 is attached to a portion constituting the main frame 12 and being located outside an area which constitutes the main frame 12 and in which a low position face 12*a* described below is formed.

The side frames 13 and 14 extend in a direction orthogonal to the movement direction of the carriage 24 (that is, the side frames 13 and 14 extend in the y-axis direction). In this embodiment, the side frame 13 is formed integrally with the main frame 12, and the side frame 14 is joined to the main frame 12 and the guide frames 15 and 16. Various constituent elements constituting the paper transportation path, such as the transportation driving roller 23, the ejection roller 30, and the paper supporting member 27, and having been described while referring to FIG. 3 are mounted and attached to the side frames 13 and 14.

The guide frames 15 and 16 overall extend in the movement direction of the carriage 24 (i.e., in the x-axis direction); support the carriage 24; and guide the carriage 24 in its movement direction.

As described above, the individual frames constitute peripheries of an area within which the carriage 24 moves. Further, the individual frames are grouped into a first frame group and a second frame group: the first frame group being a group consisting of frames each of which does not form any contact face (sliding face) with which the carriage 24 comes into contact; the second frame group being a group consisting of frames each of which forms the above contact face and has a higher hardness degree than that of any one of frames included in the first frame group.

Specifically, the first frame group consists of the main frame 12, the side frames 13 and 14, and the sub-frame 17; and the second frame group consists of the guide frames 15 and 16. Further, each of the frames included in the second frame group is made of a material whose hardness degree is higher than that of a material of any one of the frames included in the first frame group. In this embodiment, for example, the main frame 12 and the side frames 13 and 14, these frames being included in the first frame group, are each formed of an aluminum material or an aluminum based alloy, and the guide frames 15 and 16 included in the second frame group are each formed of an iron-based metallic material. In this patent description, this iron-based metallic material is a term forming a pair together with a non-iron based metallic material and is an iron material or an alloy consisting primarily of iron. In this embodiment, a zinc-coated steel sheet (SECC) is used as an example of the iron-based metallic material.

Since the plurality of frames forming the skeleton of the apparatus body 2 is configured in such a way as described above, an abrasion resistance of sliding faces (the guide frames 15 and 16), in contact with which the carriage 24 slides, can be made high by using the iron-based metallic material (i.e., a material for the frames included in the second frame group), and simultaneously therewith, a reduction in weight can be realized by forming the other frames (i.e., the frames included in the first frame group) by using the non-iron-based metallic material, such as an aluminum based alloy.

Subsequently, a relation between the main frame 12 and the panel unit 4 will be described below. As shown in FIGS. 4, 5, and 6, a high position face 12*c* and the low position face (concave portion) 12*a* are formed in the upper portion of the main frame 12, and at least a portion of the lower portion of the panel unit 4, which provides a user with a function of operating the printer 1 and a function of displaying various items, is disposed in a state of being embedded in the low position face (concave portion) 12*a*.

In FIG. 6, a reference sign "h" denotes the height difference between the high position face 12*c* and the low position face 12*a*, that is, the depth of the concave portion, and obviously from FIG. 6, a lower portion of the panel unit 4 is in a state of being embedded in the concave portion whose depth is "h". Through this configuration, in the apparatus height direction (the z-axis direction), the size of the printer 1 can be suppressed to a size smaller than the size resulting from independently adding the size of the main frame 12 to the size of the panel unit 4. Moreover, this configuration makes it unnecessary to shift the positions of the main frame 12 and the panel unit 4 in a horizontal direction (in this embodiment, particularly, in the y-axis direction), and thus also contributes to suppression of the size of the printer 1 in an apparatus horizontal direction (in this embodiment, particularly, in the y-axis direction, that is, in the apparatus depth direction).

In addition, in this embodiment, the panel unit 4 is in a state where, in the z-axis direction, the panel unit 4 is mostly embedded in the low position face 12*a* except for a small portion of the upper portion thereof, but the panel unit 4 may be in a state where the panel unit 4 is fully embedded in the low position face 12*a*. Further, the size of a portion of the panel unit 4 to be embedded into the low position face 12*a* side may be made smaller than that in this embodiment. That is, the configuration is sufficient if the panel unit 4 is disposed in a state where at least a portion of the panel unit 4 is embedded in the low position face 12*a*.

In addition, in FIG. 6, a reference sign 10*d* denotes a panel container portion constituting the upper housing 10. That is, as described above, the central upper portion 10*a* and the side portions 10*b* and 10*c* (FIG. 2) are formed in the upper housing 10, and further, a panel containing portion 10*d*, which is a concave portion for containing the panel unit 4, is formed in the central upper portion 10*a*. Further, this panel containing portion 10*d* is in a state of being embedded in the low position face 12*a* of the main frame 12, and further, the panel unit 4 is in a state of being contained in the panel containing portion 10*d*. In addition, in FIGS. 3 and 5, a reference sign 4*a* denotes a substrate constituting the panel unit 4.

Further, in FIG. 4, a reference sign 37 denotes a first flat cable that electrically interconnects the panel unit 4 and a main substrate (not illustrated) constituting a control unit of the printer 1, and a reference sign 38 denotes a second flat cable that electrically interconnects the panel unit 4 and an inclination detection means 40 for detecting the inclination of the printer 1. Further, in FIG. 5, a reference sign 4*b* denotes a connection portion to which the first flat cable 37 is connected. In addition, a connection portion to which the second flat cable 38 is connected is omitted from illustration. The above first flat cable 37 and second flat cable 38 are wired so as to extend along the high position face 12*c* of the main frame 12 from an apparatus side portion to an apparatus central portion and further extend obliquely downward toward the panel unit 4, which is embedded in the low position face 12*a* of the main frame 12.

As shown in FIGS. 3 and 4, a plurality of projecting portions 12*b* (in this embodiment, two projecting portions 12*b*) that projects in a direction intersecting with the apparatus height direction (that projects, in this embodiment, toward the apparatus rear side) are formed at the bottom of the low position face 12*a* formed in the main frame 12. The plurality of projecting portions 12*b* are provided at intervals of a predetermined distance in the apparatus width direction (the x-axis direction).

The panel unit 4, which is embedded in the low position face 12*a* side, is supported by the main frame 12 (the low position face 12*a*) when a pressing force which is caused by a button push-down operation or the like and which has a magnitude larger than a predetermined magnitude is applied to the panel unit 4. This configuration enables suppression of sinking-down of the panel unit 4 having been subjected to the button push-down operation, and thus brings about a favorable operation feeling.

At this moment, the panel unit 4 is supported by not only the low position face 12*a*, but also the projecting portions 12*b* described above. That is, the panel unit 4 is supported in a wider area, thereby enabling the panel unit 4 to be supported with more certainty.

Hereinafter, the characteristics of the printer 1 according to this embodiment will be further described. As shown in FIG. 8, the rotation shaft 20*a* of the feeding roller 20 is provided so as to extend along the low position face 12*a* in an extension direction of the main frame 12 (i.e., in the x-axis direction) in a state of not projecting from the low position face 12*a* toward the high position face 12*c* side.

Further, the feeding roller 20 is provided in a state of not projecting from a connection face 12*d* that interconnects the low position face 12*a* and the high position face 12*c*, and the feeding roller 20 is disposed at a position facing an area (a peripheral area denoted by a reference sign 12*e*) that is contained in the main frame 12 and that is formed by the connection face 12*d*.

In addition, in FIG. 8, a reference sign X1 denotes the width of the feeding roller 20, and a reference sign X2 denotes a distance between the connection face 12*d* and the feeding roller 20 in the horizontal direction (the x-axis direction). Obviously from FIG. 8, the distance X2 is smaller than the width X1 of the feeding roller 20.

Further, the feeding roller 20 and the panel unit 4 are disposed in a state of being arranged along the extension direction of the main frame 12 (i.e., along the x-axis direction).

Further, in FIG. 7, a reference sign 39 denotes a linear scale that constitutes a detection means for detecting a position of the carriage 24. An optical sensor (not illustrated) that detects the linear scale 39 is provided behind the carriage 24, and this optical sensor and the linear scale 39 constitute the detection means. Further, the linear scale 39 is disposed between the high position face 12*c* of the main frame 12 and the low position face 12*a* of the main frame 12 in the vertical direction.

Further, in this embodiment, the top portion of the carriage 24 is located at a position whose height is substantially the same as the height of the high position face 12*c* of the main frame 12.

Through the configuration described above, the height-direction size of the printer 1 and the horizontal-direction sizes of the printer 1 are favorably suppressed.

Additionally, the aforementioned embodiment is just an example, and obviously, the invention is not limited to the aforementioned embodiment. For example, in the aforementioned embodiment, the panel unit 4 provides a user with both of the function of operating the printer 1 and the function of displaying various items, but the panel unit 4 may be a panel unit that provide a user with at least one of the above two functions. Further, a panel unit has been exemplified in the aforementioned embodiment, but the invention may be embodied by using a battery unit in substitution for the panel unit. Further, in the aforementioned embodiment, a frame provided with the low position face in which the panel unit is embedded is the main frame 12 that forms a shape extending in the apparatus width direction (the x-axis direction), but the invention is not limited to this configuration. The low position face may be provided in a frame that forms a shape extending in a different direction, for example, the apparatus depth direction (the y-axis direction), and the panel unit may be caused to be embedded in the low position face side. That is, any frame may be used as the frame in which the concave portion for use in embedding the panel unit is to be formed, without being limited to a shape thereof and kinds of constituent elements mounted and attached thereto.

The entire disclosure of Japanese Patent Application No. 2014-121370, filed Jun. 12, 2014 is expressly incorporated by reference herein.

What is claimed is:

1. A recording apparatus comprising:

a carriage that includes a recording head for performing recording onto a medium, a carriage motor for driving the carriage that moves in a predetermined direction, the carriage having an upper surface;

an interior skeleton of a plurality of frames that constitute a periphery of a movement area of the carriage and supports the carriage, the interior skeleton being disposed within and supporting an upper housing forming an upper side of an outer appearance of the recording apparatus, a frame of the plurality of frames extends in an upper and a lower direction; and a panel unit that is located in an upper portion of the frame and that provides a user with at least one of a function of operating the recording apparatus and a function of displaying various items, wherein the carriage motor is attached to the frame, and wherein an upper face of the frame is formed of a high position face and a low position face in a height direction of the frame, and at least a portion of the surface opposite to the function of operating surface of the panel unit is disposed in a state of being embedded in a side of the low position face, the low position face is lower than the upper surface of the carriage and the high position face is equal to or higher than the upper surface of the carriage.

2. The recording apparatus according to claim 1, further comprising a feeding roller that feeds a medium, wherein a rotation shaft of the feeding roller is provided so as to extend along the low position face of the frame in a state of not projecting from the low position face of the frame.

3. The recording apparatus according to claim 2, wherein the feeding roller is provided in a state of not projecting from a connection face that interconnects the high position face of the frame and the low position face of the frame, and the feeding roller is located at a position facing an area that is contained in the frame and that is formed by the connection face.

4. The recording apparatus according to claim 2, wherein the feeding roller and the panel unit are disposed in a state of being arranged along the extension direction of the frame.

5. The recording apparatus according to claim 1, further comprising:

a carriage that includes a recording head for performing recording onto a medium and that reciprocates along an extension direction of the frame; and a linear scale that is provided so as to extend along the extension direction of the frame and that constitutes detection means for detecting a position of the carriage, wherein the linear scale is disposed between the high position face of the frame and the low position face of the frame in a vertical direction.

6. The recording apparatus according to claim 5, wherein a top portion of the carriage is located at a position whose height is substantially the same as a height of the high position face of the frame.

7. The recording apparatus according to claim 1, wherein the panel unit is supported by the frame in at least one case where a pressing force having a magnitude larger than a predetermined magnitude is applied to the panel unit.

8. The recording apparatus according to claim 7, wherein a projecting portion that projects along a direction intersecting with a height direction is formed on the low position face of the frame, and the projecting portion supports the panel unit.

9. The recording apparatus according to claim 1, wherein a cable connects to the panel unit, the cable is positioned the high position face of the frame.

10. A recording apparatus comprising:

a carriage that includes a recording head for performing recording onto a medium, a carriage motor for driving the carriage that moves in a predetermined direction, the carriage having an upper surface;

a frame that extends along a movement area of the carriage and supports a motor driving the carriage, the frame extends in an upper and a lower direction and being one of a plurality of frames forming an interior skeleton disposed within and supporting an upper housing forming an upper side of an outer appearance of the recording apparatus; and a panel unit that is located in an upper portion of the frame and that provides a user with at least one of a function of operating the recording apparatus and a function of displaying various items, wherein the carriage motor is attached to the frame, and wherein an upper face of the frame is formed of a high position face and a low position face in a height direction of the frame, and wherein at least a portion of the surface opposite to the function of operating surface of the panel unit is disposed in a state of being embedded in a side of the low position face, the low position face is lower than the upper surface of the carriage and the high position face is equal to or higher than the upper surface of the carriage.

11. The recording apparatus according to claim 10, further comprising a feeding roller that feeds a medium, wherein a rotation shaft of the feeding roller is provided so as to extend along the low position face of the frame in a state of not projecting from the low position face of the frame.

12. The recording apparatus according to claim 11, wherein the feeding roller is provided in a state of not projecting from a connection face that interconnects the high position face of the frame and the low position face of the frame, and the feeding roller is located at a position facing an area that is contained in the frame and that is formed by the connection face.

13. The recording apparatus according to claim 11, wherein the feeding roller and the panel unit are disposed in a state of being arranged along the extension direction of the frame.

14. The recording apparatus according to claim 10, further comprising:

a carriage that includes a recording head for performing recording onto a medium and that reciprocates along an extension direction of the frame; and a linear scale that is provided so as to extend along the extension direction of the frame and that constitutes detection means for detecting a position of the carriage, wherein the linear scale is disposed between the high position face of the frame and the low position face of the frame in a vertical direction.

15. The recording apparatus according to claim 14, wherein a top portion of the carriage is located at a position whose height is substantially the same as a height of the high position face of the frame.

16. The recording apparatus according to claim 10, wherein the panel unit is supported by the frame in at least one case where a pressing force having a magnitude larger than a predetermined magnitude is applied to the panel unit.

17. The recording apparatus according to claim 16, wherein a projecting portion that projects along a direction intersecting with a height direction is formed on the low position face of the frame, and the projecting portion supports the panel unit.

18. The recording apparatus according to claim 10, wherein a cable connects to the panel unit, the cable is positioned along the high position face of the frame.

19. The recording apparatus according to claim 10, wherein a part of the upper housing exists between the low position face of the upper face of the frame and the panel unit.

20. A recording apparatus comprising:

a carriage that includes a recording head for performing recording onto a medium, a carriage motor for driving the carriage that moves in a predetermined direction, the carriage having an upper surface;

an interior skeleton of a plurality of frames constitute a periphery of a movement area of the carriage, the interior skeleton being disposed within and supporting an upper housing forming an upper side of an outer appearance of the recording apparatus, a frame of the plurality of frames extends in an upper and a lower direction; and a unit member that is located at an upper portion of the frame, wherein the carriage motor is attached to the frame, and wherein an upper face of the frame is formed of a high position face and a low position face in a height direction of the frame, the low position face is lower than the upper surface of the carriage and the high position face is equal to or higher than the upper surface of the carriage, and wherein a concave portion embedded in a side of the low position face of the frame is formed below a lower face of an upper portion of the upper housing, and the unit member is disposed in the concave portion.

21. The recording apparatus according to claim 20, wherein the unit member is a battery unit.

* * * * *